US008371215B2

(12) United States Patent
Rinko

(10) Patent No.: US 8,371,215 B2
(45) Date of Patent: Feb. 12, 2013

(54) METHOD AND ARRANGEMENT FOR MANUFACTURING OPTICAL PRODUCTS WITH COMPLEX THREE-DIMENSIONAL FORMS

(75) Inventor: Kari Rinko, Helsinki (FI)

(73) Assignee: Modilis Holdings LLC, Wilmington, DE (US)

( * ) Notice: Subject to any disclaimer, the term of this patent is extended or adjusted under 35 U.S.C. 154(b) by 1092 days.

(21) Appl. No.: 11/980,371

(22) Filed: Oct. 31, 2007

(65) Prior Publication Data
US 2008/0196607 A1 Aug. 21, 2008

Related U.S. Application Data

(60) Provisional application No. 60/855,372, filed on Oct. 31, 2006.

(51) Int. Cl.
B29C 59/02 (2006.01)
(52) U.S. Cl. ............... 101/32; 101/3.1; 101/27; 264/299
(58) Field of Classification Search .......................... None
See application file for complete search history.

(56) References Cited

U.S. PATENT DOCUMENTS

| 4,523,246 A | 6/1985 | Okuzawa |
| 6,311,391 B1 | 11/2001 | Fuke et al. |
| 2004/0013982 A1 | 1/2004 | Jacobson et al. |
| 2004/0022888 A1 | 2/2004 | Sreenivasan et al. |
| 2005/0156342 A1 | 7/2005 | Harper |
| 2005/0178280 A1 | 8/2005 | Lee et al. |

FOREIGN PATENT DOCUMENTS
EP 1 542 074 A1 6/2005

OTHER PUBLICATIONS

International Search Report, dated Mar. 13, 2008, issued in connection with counterpart PCT Application No. PCT/FI2007/050587.
Written Opinion of the International Searching Authority, dated Mar. 13, 2008, issued in connection with counterpart PCT Application No. PCT/FI2007/050587.
International Preliminary Report on Patentability, dated Feb. 26, 2009, issued in connection with counterpart PCT Application No. PCT/FI2007/050587.
The Australian Office Action mailed Jul. 26, 2011 for Australian patent application No. 2007316112, a counterpart foreign application of U.S. Appl. No. 11/980,371, 2 pages.
<<http://www.lightemittingdiodes.org>>, Chapter 12, visible spectrum LEDs. Accessed Aug. 18, 2006.
Linder, et al., High-brightness AlGaInP light-emitting diodes using surface texturing, Proceedings of SPIE, vol. 4278 (2001).

(Continued)

Primary Examiner — Joshua D Zimmerman
(74) Attorney, Agent, or Firm — Lee & Hayes, PLLC

(57) ABSTRACT

A method, an arrangement and computer program product for manufacturing micro-optic surface design with complex, variable three-dimensional forms. A step embossing, step imprinting, a chip bonding or a corresponding device capable of patterning the surface of a target substrate is obtained. The target substrate whereto the micro-optic structures shall be patterned is obtained. A plurality of different stamping tools operable with the device is obtained. Each stamping tool includes one or more surface relief forms defining one or more micro-optic structures. A stamping tool is selected from the plurality of stamping tools by the device. The target substrate is embossed with the selected stamping tool as controlled by the device. The selected stamping tool is optionally heated or assisted by at least one ultraviolet light so as to cure the target substrate during or after the embossing. The selecting and embossing steps are repeated until the micro-optic surface design has been completed on the substrate.

23 Claims, 12 Drawing Sheets

OTHER PUBLICATIONS

Micro resist technology, Datasheet of mr-I 7000 Thermoplastic Polymer for NanoimprintLithography, <<www.nanotech.uscb.edu/NanotechNew/processing/Lithography/Materials/mr-I-7000.pdf>>, accessed Aug. 23, 2006.

Nikolajeff, Diffractive optical elements: fabrication, replication and applications, and optical properties of a visual field test. A dissertation at Chalmers University of Technology, Department of Microway Technology, Goteberg, 1997, Technical report No. 300. ISBN 91-7197-448-2.

Rooman, et al., High-efficiency 650 nm thin-film light emitting diodes, Proceedings of SPIE, vol. 4278 (2001).

Wikipedia, the free encyclopedia, "Nanoimprint Lithography", Jun. 19, 2006, <<http://en.wikipedia.org/w/index.php?title=Roll-to-roll_processing&oldid=59500414>>.

Wikipedia, the free encyclopedia, "Roll-to-roll", Oct. 24, 2006, <<http://en.wikipedia.org/w/index.php?title=Nanoimprint_lithography&oldid=83407522 >>.

Windisch, et al., Light extraction mechanisms in surface-textured light-emitting diodes, Proceedings of SPIE, vol. 4278 (2001).

The Australian Office Action mailed Dec. 16, 2011 for Australian patent application No. 2007316112, a counterpart foreign application of U.S. Appl. No. 11/980,371, 2 pages.

Translated Chinese Office Action mailed Sep. 29, 2011 for Chinese patent application No. 200780044232.5, a counterpart foreign application of U.S. Appl. No. 11/980,371, 10 pages.

Lide, Ph.D., CRC Handbook of chemistry and physics, ISBN 0-8493-0483-0, Jun. 18, 2002.

Power TOPLED, Enhanced optical Power LED, dated Aug. 11, 2004, retrieved on Feb. 21, 2012 from <<http://web.archive.org/web/20060326022137/http://catalog.osram-os.com/media/_en/Graphics/00016835_0.pdf>>, 15 pages.

Power TOPLED with Lens, Enhanced optical Power LED, dated Oct. 20, 2004, retrieved on Feb. 21, 2012 from <<http://web.archive.org/web/20060326021500/http://catalog.osram-os.com/media/_en/Graphics/00016814_0.pdf>>, 15 pages.

Rossi, et al., Wafer scale micro-optics replication technology. Presented at SPIE conference on lithographic and micro machining techniques for optical component fabrication, 2003, San Diego, 7 pages.

Translated Russian Office Action for Russian patent application No. 2009119059, a counterpart foreign application of U.S. Appl. No. 11/980,371, 13 pages, Nov. 2, 2011.

SUSS MicroTec Press Release, dated Apr. 4, 2005, retrieved on Feb. 14, 2012 from <<http://web.archive.org/web/20060312082104/http://www.suss.com/main.php?rad_id=824>>, 2 pages.

METHOD AND ARRANGEMENT FOR MANUFACTURING OPTICAL PRODUCTS WITH COMPLEX THREE-DIMENSIONAL FORMS

CROSS-REFERENCE TO RELATED APPLICATIONS

This application claims priority to U.S. provisional patent application 60/855,372, filed 31 Oct. 2006, the entire contents of the disclosure of which is hereby incorporated by reference.

FIELD OF THE INVENTION

Generally the invention relates to optics and opto-electronics. In particular the invention concerns manufacturing methods of optical microstructures.

BACKGROUND OF THE INVENTION

There is an ever-increasing demand for improving light management and luminous efficiency in many illumination applications. This hypothesis is especially applicable to LED (Light-Emitting Diode) illumination. It is necessary to utilize efficient optics with point-like light sources such as LEDs in order to achieve the required lighting performance. Solutions exploiting diffractive optics or other sophisticated micro-optic structures provide a range of new possibilities for advanced illumination including dimensional benefits and cost-effective integrations.

Generally, the fabrication of diffractive (DO) or other micro-optic structures is completed by means of lithographic processes such as mask lithography, direct laser beam, or e-beam writing. These methods have certain disadvantages, which critically limit the fabrication of preferred structures. The most critical issues relate to fabrication of complex three-dimensional shapes (like blazed gratings), flexible orientations/modulation capability, as well as large surface patterning. Lithographic methods do not perform well with blazed/slanted or hybrid profiles. On the other hand, wafers are generally provided in very limited sizes (e.g. 6 or 8 inch sizes), which sets additional burden for manufacturing of large surfaces with microstructures.

Conventional lithographic methods also primarily utilize resist layers, which requires adoption of several process steps such as etching, developing, etc. Thus the total process speed is limited and optical measurement can't be done simultaneously. In imprinting, the patterning is typically completed on the soft resist layers, by means of thermal or UV (Ultraviolet) curing. Consequently, the vertical positioning cannot be controlled in a clever manner, and a longer process time is thus required for the depth control. Most thermoplastic resists are softer requiring etching.

Recently, micro-machining has become more precise, allowing micro-optic structures to be cut with high quality diamond tools. However, there are still critical limitations, such as flexibility of structural orientations/modulation, difficulties in fabricating larger structures, large machining tolerances, etc. relating to the feasibility of such solutions.

Considering the replication of various microstructures in general and after manufacturing a master mold containing those, the used methods may include UV or thermal casting, hot embossing and injection molding, for example.

In UV and thermal casting a UV or thermally curable polymer resin is spread onto a base material, for example, PMMA. The master, e.g. a PDMS (polydimethylsiloxane) silicone stamper, is then placed in contact with the adhesive and immediately cured with an UV-lamp, or in an oven, respectively. After curing, the shim and the replica can be separated.

Hot embossing lithography, e.g. flatbed and roll-to-roll embossing, is an imprinting method wherein microstructures are formed on a substrate also using a master mold. The replication material can either be in the form of a sheet of plastic foil or a thin film, spin-coated onto a substrate. During embossing, the master, e.g. a Ni-shim, is placed in contact with the plastic film, and pressure is applied on the film being heated above its glass transition temperature Tg. After removal of the pressure, the film is cooled down and the Ni shim is removed, leaving a high quality replica of the microstructure behind.

Injection molding is an established technology for high-speed mass production of plastic components, e.g. compact discs. A master such as a Ni-shim containing the microstructure to be replicated is mounted on one side of the mold, and preheated plastic is injected into the mold. A pressure of several MPa is then applied. After rapid cooling, the molded part is extracted.

Also screenprinting (silkscreening) techniques wherein white reflective spots are printed on a carrier surface have been presented for implementing microstructures. The generated spots generally provide rather limited optical performance.

Despite of various existing methods for manufacturing different microstructures on a carrier surface the aforesaid problems have remain at least partially unsolved in the context of high-precision micro-optic products.

SUMMARY OF THE INVENTION

The objective of embodiments of the present invention is to at least alleviate some of the aforementioned problems relating to the production of optical microstructures with variable and complex, e.g. blazed and/or curved, forms. The objective may be achieved via a method of the invention applying a novel step embossing/imprinting method. Embodiments of the method are especially suitable for manufacturing masters or prototypes, but is applicable to production purposes as well.

Namely, in accordance with embodiments of the present invention, a method for manufacturing micro-optic surface design with complex, variable three-dimensional forms includes

- obtaining a step embossing, step imprinting, a chip bonding or a corresponding device capable of patterning the surface of a target substrate,
- obtaining the target substrate whereto the micro-optic structures shall be patterned,
- obtaining a plurality of different stamping tools operable with the device, each stamping tool including one or more surface relief forms defining one or more micro-optic structures,
- selecting a stamping tool from the plurality of stamping tools by the device,
- embossing the target substrate with the selected stamping tool as controlled by the device, wherein the selected stamping tool is optionally heated or assisted by UV (Ultraviolet) source so as to form and/or cure the target substrate during or after the embossing,
- repeating the selecting and embossing steps until the micro-optic surface design has been completed on the substrate.

In the above, one or more locations on the substrate may be embossed by the same stamping tool prior to selecting another tool. The substrate may include predetermined surface relief forms, such as gratings prior to embossing, or it may be free of previous forms.

The surface relief forms of the stamping tools typically include a mirror image, or actually a mirror structure, of the structure to be introduced to the surface, i.e. blazed protrusions on a tip of a stamping tool introduce blazed grooves on the surface upon embossing etc. The surface relief forms may be positioned as a function of a location on the stamping tool (stamping surface). The selecting step may include, optionally first laying down the currently selected stamping tool, picking up a new stamping tool from a tool tray with a manipulator arm/stamping head of the patterning device. Alternatively, the selecting action may refer to another type of procedure of changing the active stamping tool, such as rotating a plate having multiple tools formed as protrusions thereon so that a desired one can be used for embossing purposes.

In another aspect, embodiments of the present invention include an arrangement for manufacturing micro-optic surface design with complex, variable three-dimensional forms, the arrangement includes a processor and a memory for processing and storing information, respectively, a movable member for receiving a stamping tool or a target substrate, and a number of stamping tools operable with the device and capable of embossing a target substrate with associated micro-optic surface relief forms, wherein the arrangement is configured to obtain information defining one or more embossing parameters or an optical design objective in relation to the target substrate, select a stamping tool from the number of stamping tools according to the information, move the stamping tool in relation to the substrate so as to emboss a plurality of pre-determined areas of the target substrate with the stamping tool, and repeat a procedure of selecting a further stamping tool from the number of stamping tools and moving the selected further stamping tool according to the information so as to emboss one or more predetermined areas of the target substrate with the selected further stamping tool, until the optical design objective has been completed.

The arrangement may be implemented as a single device or as a system of multiple connected devices.

In a further aspect, embodiments of the present invention include a computer program product for controlling manufacturing of a micro-optic surface with complex, variable three-dimensional surface design by a step embossing, step imprinting, a chip bonding or a corresponding device capable of patterning the surface of a target substrate with a plurality of different stamping tools operable with the patterning device, each stamping tool including one or more surface relief forms defining one or more micro-optic structures, is provided, the computer program product including a computer readable medium and computer program instructions recorded on the computer readable medium and executable by a processor to perform the actions of:

obtaining information defining one or more embossing parameters or an optical design objective in relation to the target substrate, selecting a stamping tool from the plurality of stamping tools according to the information, controlling movements of the stamping tool in relation to the target substrate so as to emboss a plurality of predetermined areas of the target substrate with the stamping tool, and repeating a procedure of selecting a further stamping tool from the number of stamping tools and controlling movements of the selected further stamping tool according to the information so as to emboss one or more predetermined areas of the target substrate with the selected further stamping tool, until the optical design objective has been completed.

The utility of embodiments of the present invention arises from a plurality of issues. Firstly, the advanced step embossing (ASE) patterning method of embodiments of the invention can provide optical modulation with versatile and variable multi-dimensional surface relief patterns even on large patterning areas. Also the density of patterns can be easily adjusted. Secondly, designed configurations are easy to manage and modify. Further, immediate adjustment can be enabled and completed by real time measurements, which eliminates design iterations; e.g. target uniformity of a light guide design can be fixed and later achieved by adding more micro-optic patterns onto the desired layer surface in stepwise manner. The patterned target substrate, such as a polymer layer/plastic sheet, can provide a fully functional micro-optic sample or the actual end product. In addition, this sample can be utilized for tool preparation by means of electroplating. Additional mastering processes typically are not needed. Same basic stamping tools can be applied to many optical designs and patterns.

Embodiments of the presented solution can enable manufacturing of very small optical elements (e.g. DO lenses) and can support optical integration in the manufacturing (e.g. integrated LED optics). The number of process steps is also reduced, which cuts down the duration of the overall process and enables cost-savings. The embossing functionality may be tailored to many existing step embossing, imprinting or e.g. chip bonding devices with few component amendments, additions and/or software changes. The ASE patterning method may provide new opportunities for fabricating e.g. diffractive optics. It may suit numerous applications of LED illumination, which require special DO patterns. Two further base solutions include micro-optic, e.g. refractive and/or DO, light guide elements and corresponding transmission elements, for example. These solutions may be applied for example, to consumer products such as mobile terminals, televisions, personal digital assistants, wrist computers, without forgetting automotive industry, advertizing and traffic or street lighting, for example. In a further embodiment the method or arrangement of the invention may be used to manufacture opto-electronic surface designs in addition to or instead of micro-optic structures.

In one embodiment the principles the invention are applied in manufacturing micro-optic structures on a substrate material. Variations of the basic solution are disclosed as well.

Further embodiments e.g. micro-optic lenses suitable for use with LEDs, may be manufactured in accordance with the invention and a substantially real-time input and embossing adjustment method/equipment may be reviewed.

DETAILED DESCRIPTION OF EMBODIMENTS OF THE INVENTION

Figure 1:
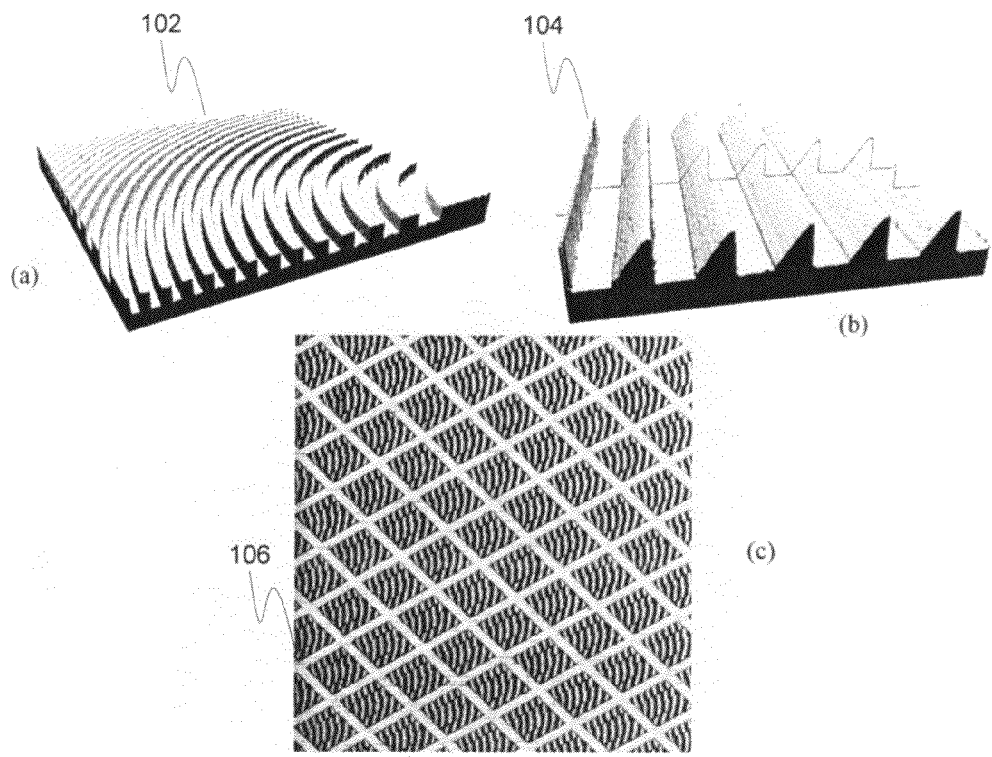
FIGS. 1a and 1b represent embodiments of curved binary gratings and linear blazed gratings that both can be obtained by the arrangement of the present invention.
FIG. 1c represents an embodiment that includes a plurality of hybrid units.

The advanced step embossing method according to embodiments of the invention typically utilizes a plurality of different stamping tools to generate variable micro-optic, e.g. DO, patterns having binary and/or blazed grating profiles, for example. Such profiles may be in a form of surface relief patterns on the substrate. The substrate may, in this context, be the material whereto the micro-optic patterns are actually formed and the substrate itself may be provided on top of a different carrier medium, e.g. as an upmost layer. The stamping tools can be manufactured by means of high precision micro-machining or lithographic processes depending on the required micro-optic structure. Further, a novel stamping tool manufacturing method will be presented hereinafter. Micro-machining typically is more suitable for slanting structures, such as 45° blazed gratings, than lithographic methods, whereas lithography typically is feasible for binary grooves, for example. In the context of micro-machining, it may be advantageous to concentrate on high quality structures, which are simple and form small patterns. Larger patterns may be especially challenging with micro-machining due to tool wear. Two utilized grating profiles that can be obtained via utilization of stamping tools are shown in FIGS. 1a and 1b. Reference numeral 102 marks a curved binary grating and reference numeral 104 identifies a blazed grating. The profile of the blazed grooves has been further highlighted by a profile line in the figure, naturally missing from the true physical grating. Reference numeral 106 in FIG. 1c identifies a substrate surface including a plurality of hybrid units, i.e. units that include a number of sub-areas with different or differently aligned surface relief patterns. Embodiments of methods of the invention suit well in manufacturing such hybrid units and larger surfaces including those.

The micro-machined or otherwise obtained stamping tools may include single or multiple surface relief forms, such as grating grooves, which may form small grating or other micro-optic patterns, e.g. 5×5 microns, 20×20 microns, 50×50 microns and 100×100 microns in size. The tools can be made from metallic materials, such as nickel or copper, for example. Also optically transparent materials can be used. The tools can be utilized in step embossing that may be heat embossing, thermal embossing or UV-embossing, for example, whereby the stamping tools can also be replicated with silicone-based material thus forming PDMS stamping tools allowing UV light to pass through and cure the underlying material. Each tool typically has uniquely designed micro-optic, e.g. DO, structures (size and/or profile) that may replicate the corresponding patterns on the preferred location of the target substrate, e.g. on a plastic plate. The amount of required tools, micro-optic patterns and patterning steps may be predetermined by each optical application, i.e. by the desired optic target design. In one embodiment of the invention, a master structure including positive (e.g. protrusions) surface relief forms may be modulated by means of at least partially flat stamping tool in order to flatten the structure of a predetermined area.

The advanced step embossing of the present invention is generally a technology, where different kinds of structures may be replicated by pressing them onto a material such as a polymer. Pressing may be performed mechanically using precise pressure, temperature and/or time parameter values. Such replication parameters may play an important role in the success of step hot embossing. Unlike in the conventional flatbed embossing or roll-to-roll embossing methods, the structures may be embossed individually by stepping them one after another.

The advanced step embossing offers the possibility to use different types of micro-optic structures during the same embossing process, because the tool can be automatically changed to another during the process controlled by the software of the used patterning device. Thus, the end-product may contain a heterogeneous amount of structures, which is an advantage over existing embossing methods, and the basic tool kit may provide such versatility that application-specific new tools may need to be added to the overall selection rather seldom. Additionally, step embossing allows a large surface area to be filled with microstructures, while maintaining good quality also at macroscopic levels. The large area can then be replicated, as a whole, to a substrate to be used as a master for further large area replication processes. Depending on the manufacturing device, this technology can be also utilized in mass production.

Figure 2:
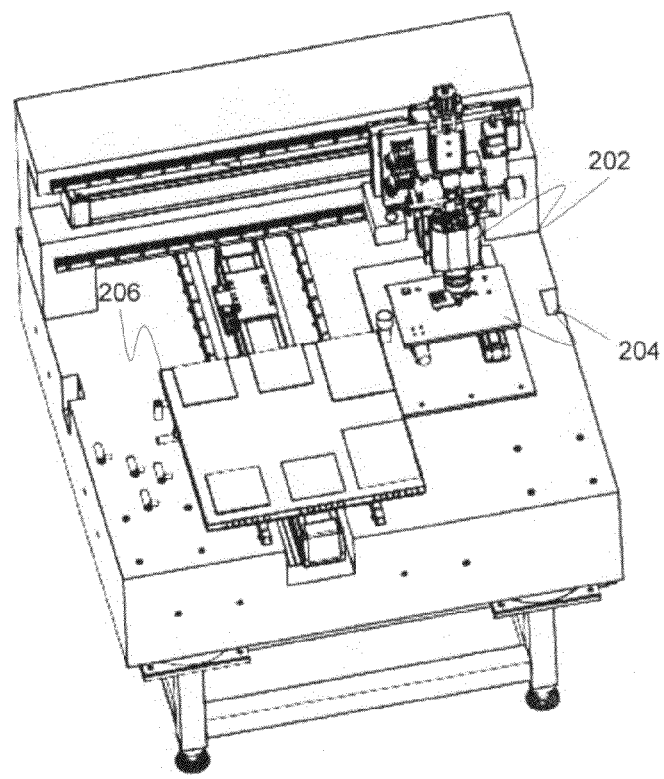
FIG. 2 depicts one example of a device capable of executing the method of the invention.

A flip-chip bonder, such as the one available from The Toray Engineering Inc., is a mass production machine for the electronics industry and represents one feasible equipment option in the context of the present invention. A corresponding device is shown in FIG. 2 including a worktable 206 and a stamping head 202 ('bonder') that can be moved in relation to each other. It is possible to attach different kinds of tools, such as stamping tools, onto the head. Attaching a tool can be done by vacuum adapter from a tool tray area 204, for example. The device typically includes a means for verifying and adjusting the alignment of the stamping head 202 and/or the attached stamping tool in relation to the worktable 206 or each other. In addition, a means for monitoring and adjusting the temperature of the stamping head 202 and/or stamping tool may be included for heat embossing. Namely, in the originally intended use a circuit board is placed on the table where there are vacuum holes to keep the board in place. The head 202 picks a chip from a specific tray onto its tool tip by vacuum and then bonds the chip onto the board. The attachment by vacuum can be utilized in the context of stamping tools as well. In automatic mode, the machine picks a tool and rapidly moves to predetermined embossing locations and creates the desired patterns.

In one embodiment the table 206 moves in vertical 'x' and 'y' directions, and the head 202 moves in horizontal 'z' direction in relation to the plane of the table 206. There is also a tilting angle adjustment for the table 206. The tilting angle can be advantageously changed in the context of non-flat surfaces, for example. In another embodiment a device where the table 206 stays static and only the head 202 moves and optionally rotates can be used. In a further embodiment a device wherein the table 206 moves and optionally rotates in predetermined directions and the head 202 stays static, can be utilized. Yet in further embodiments, any desired combination of table 206 and head 202 movability can be applied.

The used device is preferably highly accurate, i.e. the x and y movement accuracy is about 0.5 µm and the z movement accuracy is about 5 µm or less, for example. These precisions typically also hold across the entire movement range, which can be several centimeters in every direction. In the case of heat embossing the head temperature is typically controllable up to a predetermined reading, e.g. about 400° C., and the heating is typically instantaneous due to the use of an induction heater, for example. It is also possible to adjust the pitch of the head in x and y directions to assure perpendicularity. Regarding pressure, there may be two or more ranges, e.g. one for low pressure and another for high pressure. Low pressure could be up to about 16 N in force, while high pressure ranges from about 16 N to about 150 N in force. Also, other figures concerning the accuracy, temperature, and pressure can be used depending on the application. Further, the embossing speed/time is typically adjustable.

Figure 3A:
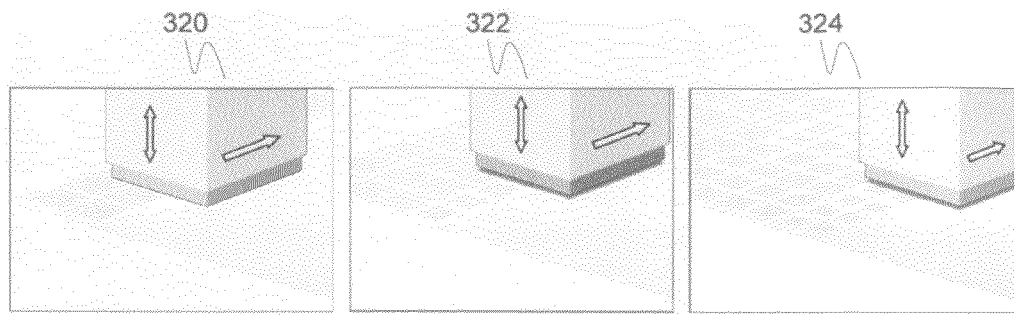
FIG. 3a illustrates three stages in an ASE patterning method according to one embodiment of the invention.

FIG. 3a illustrates three stages in an embodiment of a step embossing method wherein a first stamping tool with a first surface relief pattern is used for patterning the substrate at 320. Then, the stamping tool is changed and another, e.g. smaller, pattern is embossed at 322. At 324 a third stamping tool is utilized, still producing a different micro-optic pattern. The arrows depict the movement of the head, i.e. both vertical (actual embossing) and horizontal (movement between embossing locations) movement is needed. Further, the rotation between the head and the substrate/worktable on which the substrate is located can be achieved either by rotating the head and/or the table in relation to the vertical axis or the horizontal axis (tilting).

When data for initiating embossing towards the optical target design, the data typically including at least a preliminary definition of the required stamping tools, has been obtained, the principal patterning can be activated in relation to the source design. Each design typically requires using several stamping tools, all of which have corresponding embossing coordinates ("bitmap") to generate the designed patterns on the substrate. The step embossing can initiate the micro-optic patterning phase with the first stamping tool and typically traverses through all programmed coordinates linked thereto so that unnecessary twiddling with the embossing tools can be avoided. In another embodiment, the tool may be changed for another during the process and reverted later back to the previous one. This may take place e.g. in relation to manufacturing hybrid patterns. After finishing embossing with the first stamping tool, the operation is repeated with the second stamping tool, etc. Any combination of tools may be utilized in any sequence to produce a desired pattern.

Typically, the utilized embossing device can be configured to act in a user-determined manner. The basic routines for controlling the head/manipulator arm, the table, heating, etc. may advantageously be integrated in the device, but the programs for creating the micro-optic structures can be thoroughly controlled via user input via keyboard/keypad/buttons of the device or via other communication elements, such as a computer file transferred over a data interface of the device.

The programmed coordinates typically include at least x- and y-values, but occasionally the degrees of angle (rotation, tilting, etc) and the depth values (z-value) are also taken into account. Further, the overall program for controlling the patterning may include pressure and/or heat control data, unless default values stored in the device are to be applied. Optionally, other control data, e.g. camera vision control data, may also be provided to the device.

Figure 3B:
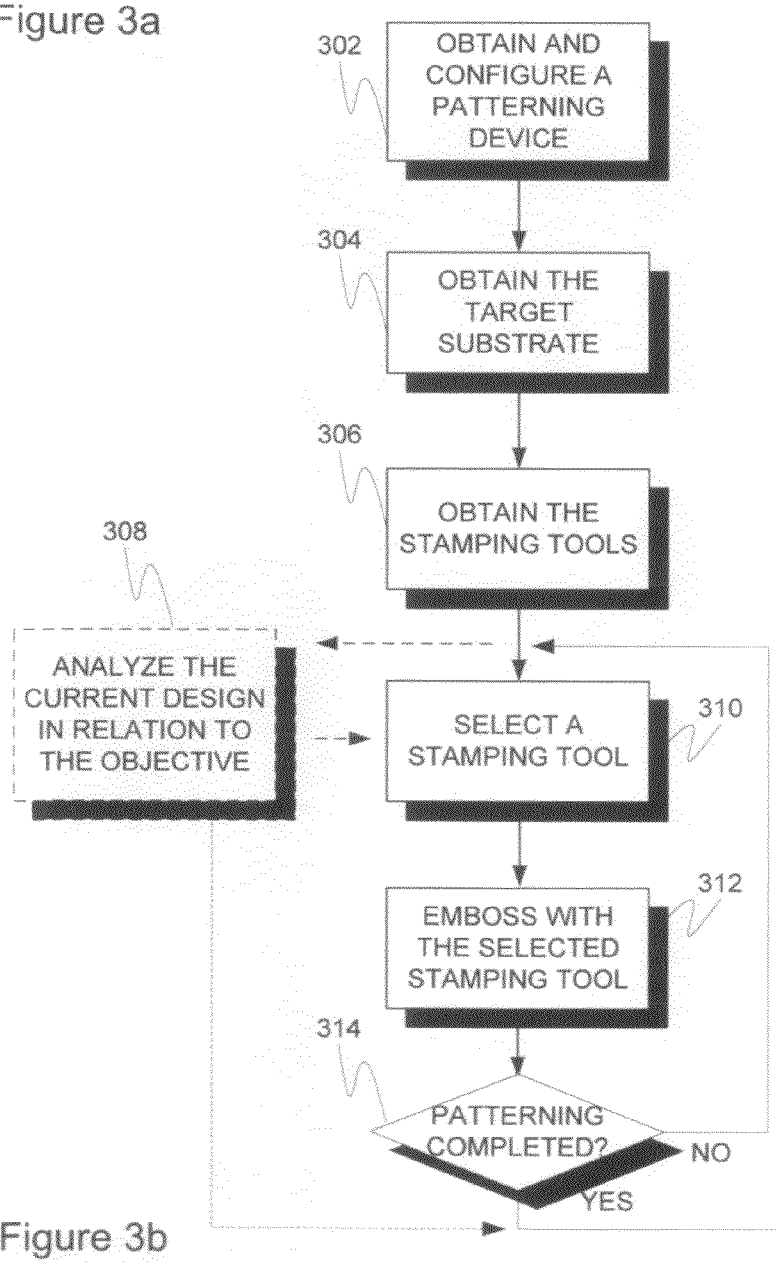
FIG. 3b is a flow diagram of one embodiment of the ASE method in accordance with the invention.

FIG. 3b is a more specific flow diagram of one embodiment of the method in accordance with the present invention.

According to the embodiment illustrated in FIG. 3b, at 302 the patterning device, such as a step embossing, step imprinting, a chip bonding or a corresponding device capable of patterning the surface of a target substrate is obtained and configured. For example, the controlling logic of the device may be tailored so as to enable micro-optic patterning of the surface of the target substrate. Coordinate information or other embossing parameters, such as temperature, speed, stamping tool, pressure, or further control data, may be obtained. Optical design-specific or general (e.g. default parameter values) tailoring information may be input to the device via a user or data interface, for example.

At 304 the target substrate whereto the micro-optic structures shall be patterned is obtained. The substrate may be a piece of material or e.g. a layer on top of another material. The substrate may include e.g. thermally curable, thermally formable, room-temperature formable material or material formable in some other, predetermined temperature range, wax-type material, thermoplastic or UV-curable material.

At 306 a plurality of different stamping tools operable with the device is obtained. Each stamping tool may include one or more surface relief forms defining micro-optic structures, i.e. it may be either a single-structure or a multi-structure stamp. New stamping tools with desired surface relief forms may have to be manufactured for a particular optical design. A laser ablation technique described below may be utilized in the manufacturing, or the stamping tools may be fabricated using conventional lithography or micro-machining, or a combination thereof. The stamping tools or at least stamping surfaces of the tools may include metallic materials, such as nickel or copper. In UV-embossing e.g. silicone stamping tools may be used.

Reference numeral 308 relates to optional activities that may take place during execution of the inventive method. For example, in one embodiment of the invention one or more parameters of the desired optical target design may be provided to the patterning device that during stepwise processing analyzes the current design, e.g. by camera, and adjusts the embossing procedure, such as stamping tool selection and/or embossing locations accordingly.

At 310 a stamping tool is selected from the plurality of stamping tools by the device. A tool that either according to a predetermined program or on the basis of real-time input shall be used next is selected. Selecting may refer, in addition to analysis and/or decision-making also the necessary physical acts; a manipulator arm may be configured to pick-up the tool and attach it to the stamping head connected to the arm, or a rotatable plate of the head/arm including a plurality of stamping tools may be rotated so as to arrange the desired tool in use position, etc.

Further, different alignment, calibration and other preparatory actions may be executed at this stage. Temperature of the stamping head may be checked and increased, if necessary, by heating for heat embossing, for example. In one embodiment, the temperature of the stamping head may also be adjusted lower by active, i.e. assisted, cooling or by just letting the stamping head cool. The stamping head alignment and position in relation to the table and substrate may be verified and adjusted. Also the pressure calibration can be performed. A skilled person will appreciate a possibility to execute such actions also during the patterning procedure.

At 312 the target substrate is embossed with the selected stamping tool as controlled by the embossing device. The substrate, depending on the used material, may be cured already during the embossing (thermally curable materials), may be left to cure without supporting actions after heating, which is the case with thermoplastic materials, such as thermoplastic polymers, PMMA (polymethyl methacrylate) for example, or when the substrate is UV-curable such as UV-curable epoxies, UV light can be used for the curing after the embossing. Also dual-curable substrate materials may be utilized.

During the embossing, the manipulator arm and head thereof, the worktable, or both may move according to the instructions provided by the used patterning program and possible real-input. Movements may adjust the embossing location on the substrate, lifting and lowering of the head with stamp, and related angles (rotation in relation to the surface normal of the table, tilting).

Item 314 refers to decision-making concerning whether the desired, modulated micro-optic surface is ready on the substrate, or whether the procedure shall continue and different stamping tool be used. The decision-making may be based on a predetermined program and/or real-time analysis of item 308. When the patterning is completed according to a selected criterion, execution of the method ends.

Figure 3C:
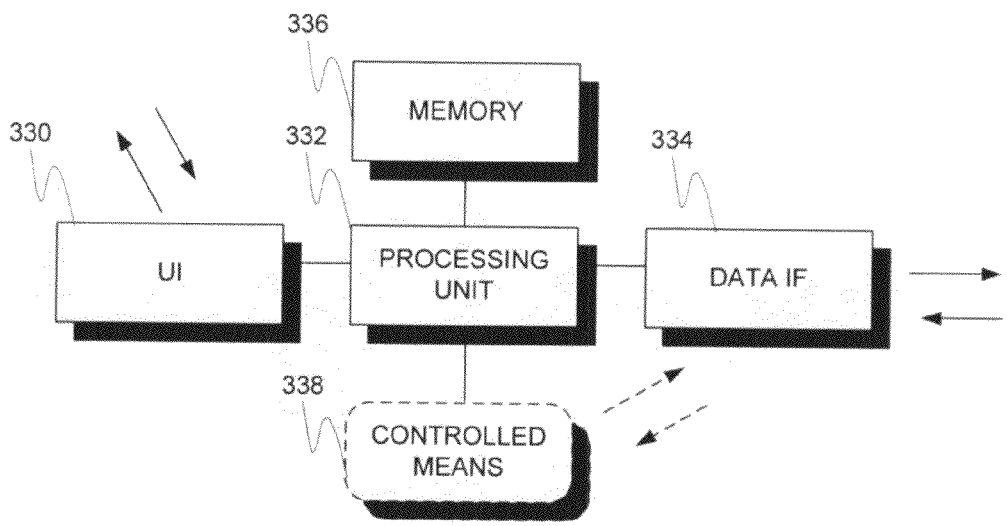
FIG. 3c is a block diagram of a device in accordance with an embodiment of the current invention.

FIG. 3c is a functional block diagram of internals of an embossing device in accordance with an embodiment of the current invention. The device includes a processing unit 332 such as a microprocessor, a DSP (Digital Signal Processor), a microcontroller, programmable logic, or a plurality of aforementioned entities. The processing unit(s) 332 may control the actions performed by the device according to instructions that may be stored in a memory 336 including one or more volatile and/or non-volatile memory chips, memory cards, hard disk drives, etc. The instructions, e.g. an embossing device control program or a patterning program including a plurality of instructive parameter data for fabricating a desired optical design, may be provided through a data interface 334, such as a wireless or wired network adapter or on a physical carrier, such as a memory card, optical disc, floppy disc, etc. The UI (User Interface) 330 may be arranged to enable local and/or remote control or monitoring over the functionalities of the device. The UI 330 may include e.g. button(s), mouse, keypad, keyboard, display, projector, touch screen, voice recognition interface, tactile interface, etc. In the case of remote features, such may be provided over the data interface 334 as well. The controlled means 338 may include, depending on the device, e.g. a manipulator arm and stamping head, a worktable, a heater, light(s), a dispenser, a camera and various other sensors such as pressure, distance, and temperature sensors. The device may be able to control external elements via the data interface 334, for example, as represented by broken line arrows in FIG. 3c.

Figure 4A:
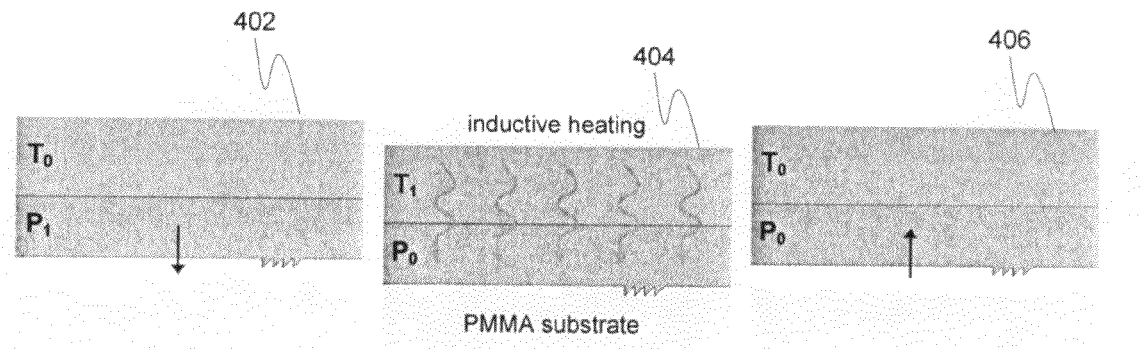
FIG. 4a visualizes different ways in which the replication of micro-optic structures may take place according to exemplary embodiments of the present invention.

FIG. 4a illustrates a scenario according to one embodiment of the invention, wherein e.g. transparent substrate material, such as PMMA sheet, can be used. Several other thermoplastic or thermally formable materials are also suitable. The PMMA sheet is easy to emboss and fidelity replication of micro-optic patterns can be achieved with optimized process parameters. The one beneficial aspect of step hot embossing is the control of the embossing depth. When conventional methods require very precise vertical positioning control (so-called z-axis control), which decelerates the process, the new solution makes possible the use of a stamping tool, which has a relatively low density, i.e. 'filling factor', of surface relief structures, see sub-figure 402. This patterned area on the tool surface can be about thousand times smaller than the non-patterned plain surface area (e.g. $1/1000$). When small patterns are embossed on the PMMA surface, the plain surface of stamping tool stops the vertical movement by the monitoring and control of associated contact pressure and changes thereof, see sub-figure 404. This is a control method that advantageously significantly accelerates and facilitates the step embossing process. In addition, when embossed patterns are positioned close to each other, the non-patterned stamping tool surface doesn't damage and deform previously patterned areas, due to its large contact surface, precise pressure control, and/or programmed patterning order, see sub-figure 406, wherein the previously embossed figures stay substantially intact.

Instead of step heat embossing using e.g. thermoplastic substrate materials, step UV-embossing may be applied together with optically clear UV-curable resins. UV light-assisted embossing provides high-fidelity replication of single micro-optic patterns. One solution includes discrete patterning, e.g. in lens integration and lens matrixes to be explained in more detail later in this text, when the UV-curable resin is dispensed onto a rigid substrate, such as plastic sheet or a LED package. This embodiment may utilize silicon-based PDMS stamping tools, for example.

It is also possible to use a UV-coated substrate with a stamping tool, but depth control may then become critical. Another solution is to utilize UV coated plain substrates such as PMMA resist. Depth control may then be achieved by precise vertical positioning control.

Figure 4B:
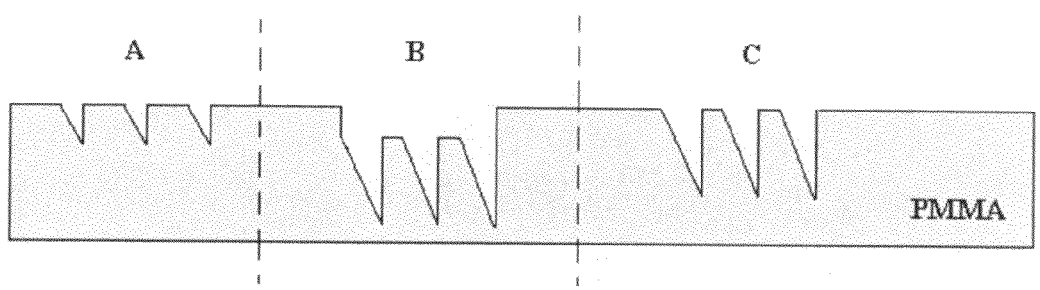
FIG. 4b visualizes pressure and depth control in step embossing according to an embodiment of the present invention.

FIG. 4b discloses three instances of the same replicated micro-optic structure, each provided by a single stamping tool operation. It can be seen from FIG. 4b that in example A the embossing depth has been too low and in example B the target depth as shown by example C has been exceeded. The overall depth of the embossed structure shall not be too low, nor can it be pressed too deep into the material. Utilizing a feasible combination of pressure and heat/temperature control with optional direct embossing depth control, probability to obtain intended high-quality surface relief forms increases.

Figure 5A:
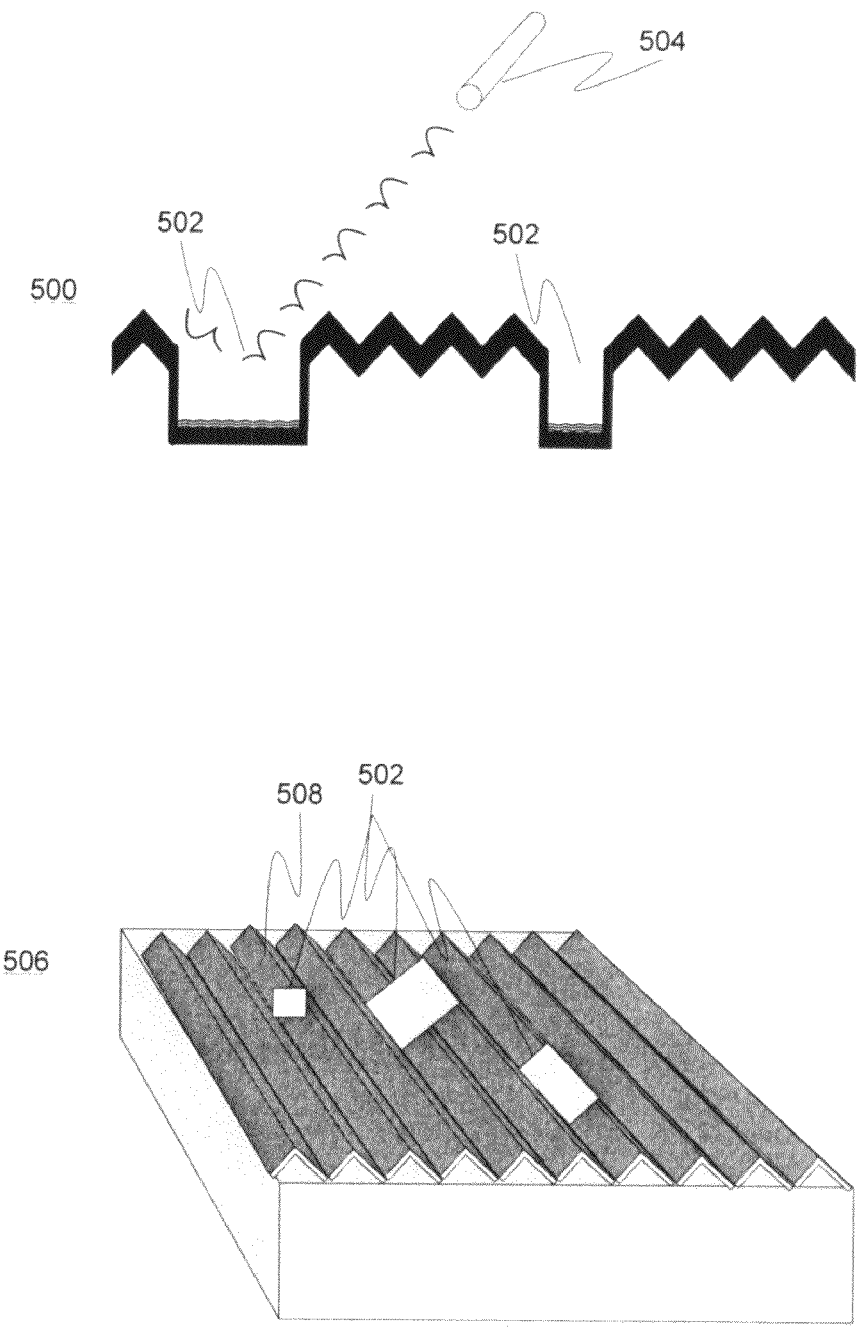
FIG. 5a depicts the utilization of laser ablation in manufacturing stamping tools according to an embodiment of the present invention.

FIG. 5a illustrates an embodiment wherein laser ablation is used to engrave a substrate surface including micro-optic relief forms, e.g. a grating; see a cross-sectional representation 500 and a visualization of a true three-dimensional scenario 506. The laser beam from a laser device 504 is arranged to engrave predetermined areas 502 so that a number of stamping tool micro-optic structures are formed from the remaining structures 508 left between the engraved grooves and recesses. Further, one or more individual single- or multi-structure stamping tools may be cut, e.g. by laser, from a larger substrate structure. The substrate may be a nickel shim, for example. Such a nickel shim may be e.g. about 0.3 mm thick, and the laser or otherwise cut stampers may have outer dimensions of about 4×4 mm. In another embodiment, laser ablation is applied on a silicone surface to obtain a PDMS stamping tool. Micro-optic structures in the center of stamping tool may be: a) 20×29 μm, b) 100×29 μm, or c) 500×29 μm, for example. Other dimensions for these elements are also possible, depending upon the application. Laser tends to produce a rather rough surface, but in principle also actual micro-optic structures may be produced therewith. Typically, in the visualized structures 500, 506 the minimum engraving depth is e.g. 50 μm so that the produced rough pattern does not cause artifacts to the substrate when the remaining structures 508 are used to emboss micro-optic structures as tip(s) of one or more stamping tools. Surface area of the structure can be protected by coating, which can be solved afterwards. In addition to stamping tool manufacturing, the laser ablation is applicable to construction of larger modulated (micro-)optic surfaces as well.

Figure 5B:
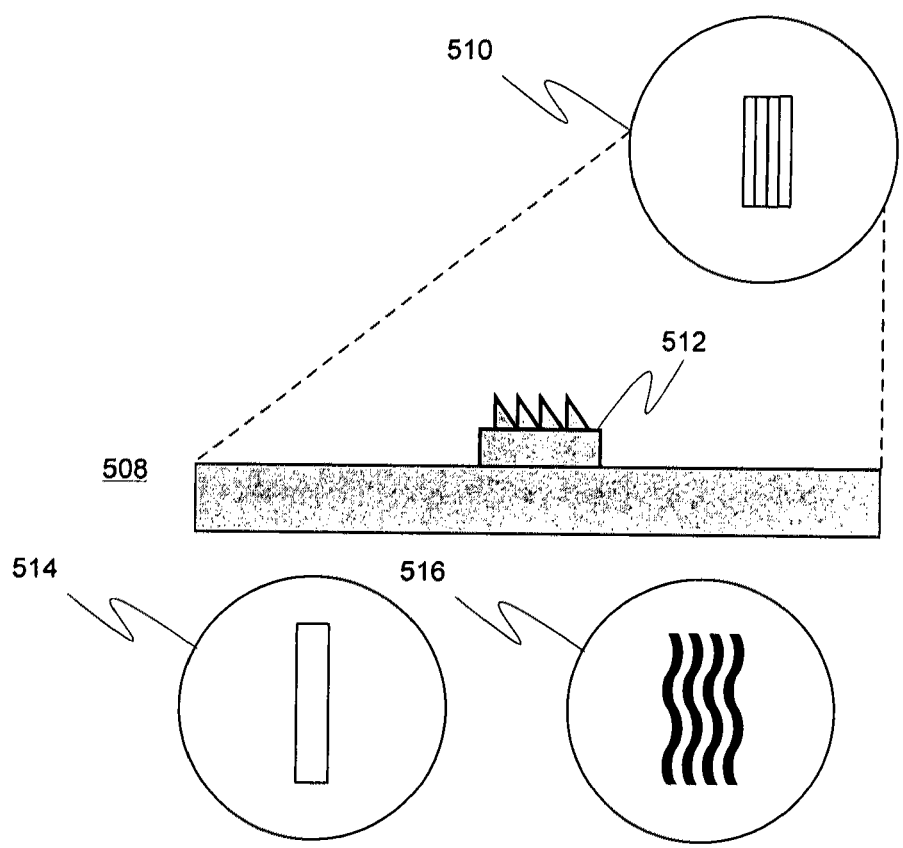
FIG. 5b depicts different single-structure stamping tools according to exemplary embodiments of the present invention.

FIG. 5b illustrates a cross-section of a single-structure stamp 508, wherein the structure 512 is centered, by way of example, on the stamping surface as can been seen from planar view 510. In further embodiments different structures, such as structure 514 and 516, can alternatively be used; e.g. shape, size, and alignment of structures may be different.

Figure 5C:
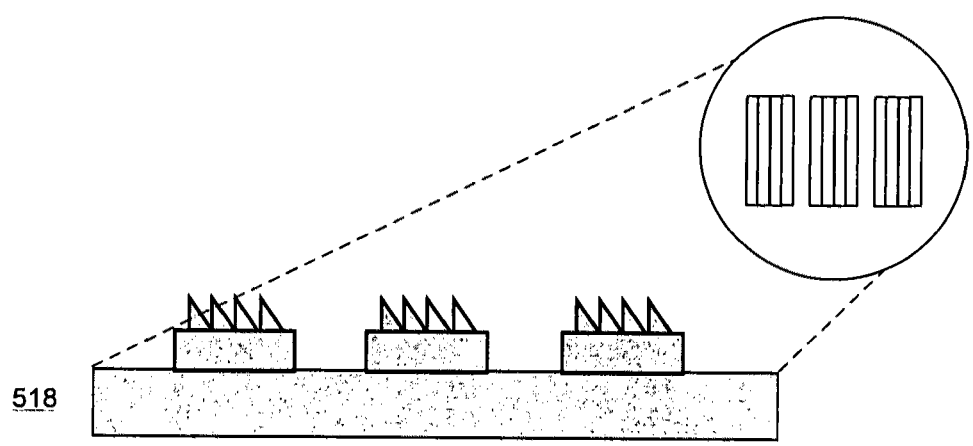
FIG. 5c depicts a multi-structure stamping tool according to an embodiment of the present invention.

FIG. 5c illustrates a multi-structure stamp 518 including in this particular embodiment three similar structures with physical separation on the stamping surface (tip of the stamping tool). Likewise, the structures within the multi-structure stamp may vary in shape, size, and alignment; they may be positioned next to each other without physical distance; and/or they may be nested by over-embossing and form a hybrid structure, etc.

Figure 5D:
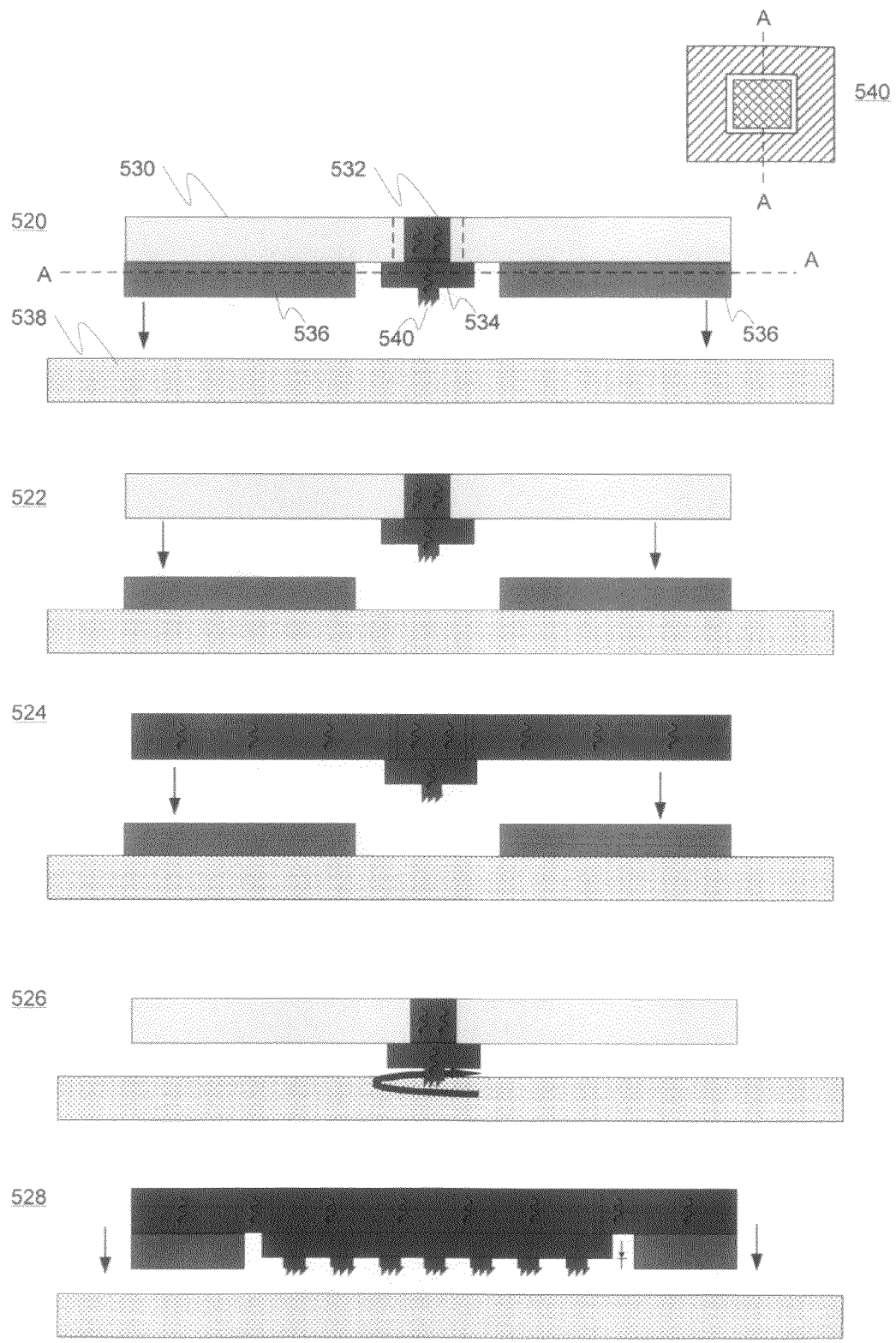
FIG. 5d visualizes different depth and/or heat control solutions according to exemplary embodiments of the present invention.

FIG. 5d discloses various optional embodiments for depth and/or heat control in the step embossing solution according to embodiments of the invention.

In embodiment 520 shown at the top of FIG. 5d, the stamping tool 534 includes a micro-optic structure 540 attached to the stamping head/manipulator arm 530 by vacuum (note the two vertical lines representing vacuum channels for carrying out an air-suck function), for example. In the case of heat embossing, the heat is conducted to the stamping tool 534 from the heat source via heat conductive material 532, preferably as accurately as possible. Further, an insulation, and/or stopper, and/or alignment member 536 is coupled to the stamping head 530 and/or the stamping tool 534; in the visualized case there is a small distance between the head 534 and the member 536. In stopper and/or alignment action the member(s) 536 guides the embossing such that the structure 540 deforms the surface area of the substrate 538 only to a predetermined depth and prevents the structure 540 from proceeding deeper. As a heat insulator, the member 536 prevents heat conduction from the stamping tool 534 and/or the head 530 to the surface areas of the substrate 538 adjacent to the area under embossing by the structure 540. Namely, such areas may already include micro-optic structures that could deform due to induced heat. The planar view 540 depicts the same scenario from a different angle. Stamping tool 534 resides in the center surrounded by the member 536. As an example of a tool material, nickel is given, and as an example of a substrate material, PMMA is given. As an example of material selection of the member 536, Teflon, polyimide, high-temperature resistant technical polymers such as fluoropolymers, and ceramic materials are given.

In embodiment 522, the member(s) 536 may be positioned on the substrate 538 as a surface mask, for example.

In embodiment 524, the whole head 530 is heated, whereby integrated or substrate-based insulator and optionally depth control sheet/layer, are typically used.

In embodiment 526, the stamping tool 534 includes structure 540 arranged as a sufficiently elongated protrusion from the tool's surface such that upon pressing the tool 534 towards the substrate 538, the desired depth is reached prior to contact between the rest of the tool 534 or head 530 with the substrate 538. The remaining space can be utilized for air cooling, which can be enhanced by utilizing additional air blowing function as depicted by the curved arrow in the figure. In another, either alternative or supplementary embodiment the whole area under embossing and/or adjacent thereof may be air-cooled after the stamping tool 534 has been lifted up from the surface of the substrate 538.

In embodiment 528, it is shown that the above principles can be applied to multi-structure stamping tools as well.

Figure 6:
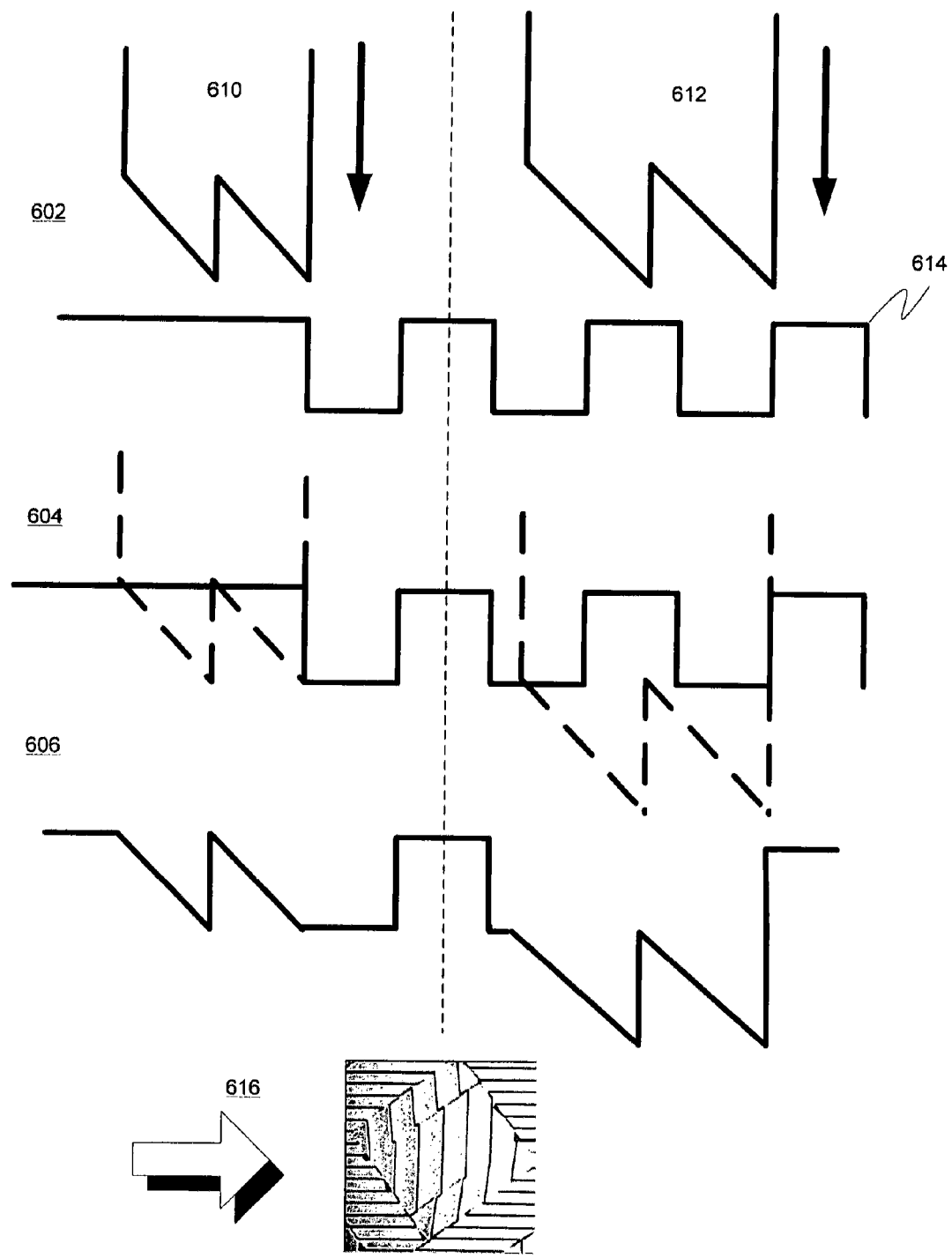
FIG. 6 discloses one embodiment of over-embossing according to the present invention enabling creation of nested hybrid structures.

FIG. 6 discloses examples of how the principles of over-embossing can be applied in the context of the present invention by two examples. On the left side of the figure, as separated by the dotted vertical line, a stamping tool 610 with blazed surface relief structure is used to emboss the corresponding mirror image next to an existing, in this case binary, groove on the substrate 614. In the example on the right, a stamping tool 612 with a larger micro-optic pattern is applied to an existing surface relief, this time binary, surface. The initial structure is shown at 602. Then, the tool penetrates 604 the existing surface relief structure and forms the associated larger pattern to a predetermined depth. The delicate pressure, heat, and/or depth control enables producing 608 adjacent and nested structures, such as hybrid structures 616 without considerable artifacts. For example, such embossing may utilize heat embossing, wherein the substrate includes thermo-formable material and the near-by substrate structures can be protected by the members of FIG. 5d and/or by constructing stamping structures that substantially protrude from the rest of the stamping tool/head so as to enable particularly localized heat conduction to the substrate with additional air cooling effect.

Figure 7:
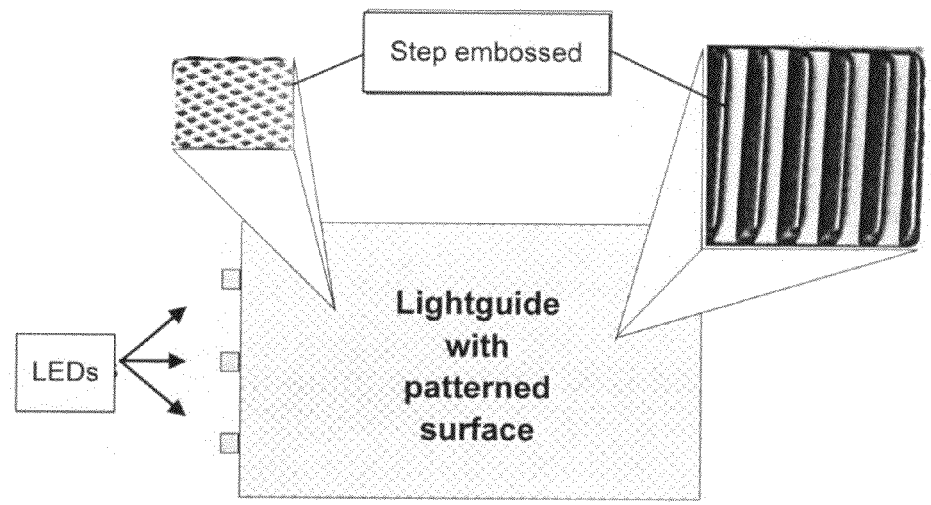
FIG. 7 discloses an embodiment of a light guide patterned according to the invention.
Figure 7:
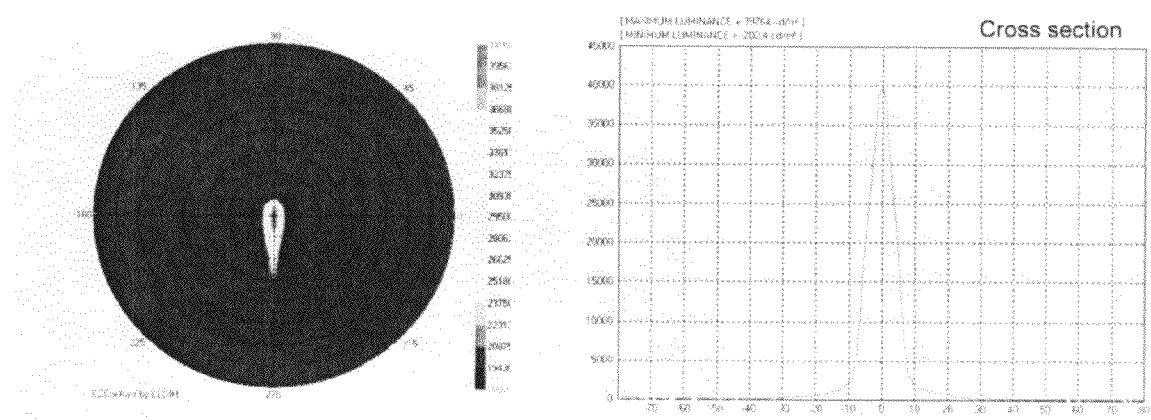

FIG. 7 illustrates a light guide embossed in accordance with an embodiment of the present invention. Efficient light outcoupling from the light guide, i.e. through a desired light-exit surface, typically dictates using a number of micro-optic surface relief structures so that the overall surface encompasses a varying and complex micro-optic design. The visualized patterns are examples of possible surface relief forms. The light sources, such as LEDs, may be provided to the side of the light guide. From the light radiation pattern and directivity curve obtained due to the use of one particular design according to the invention, it can be seen that the suggested embossing solution is capable of producing optical designs with high directivity, i.e. the output light is efficiently collimated in relation to a desired direction, which can be the surface normal of the exit surface, for example.

Enhanced control of light directivity is typically one of the design goals when pointlike light sources such as LEDs are used. Collimation can be achieved with micro-optic, e.g. diffractive optics, lenses, for example, which can be small in size but which gather and collimate the light from the whole luminous surface, like the surface of a LED. An advantage of using e.g. a DO-lens over a traditional lens is the possibility to attach the lens straight onto the LED making the whole assembly very compact. In addition, DO lenses are suitable for replication, hence making costs for one lens low. Next, two innovative solutions to combine a micro-optic lens to a LED will be introduced, and it will be shown that these methods are also appropriate for industrial manufacturing.

Figure 8A:
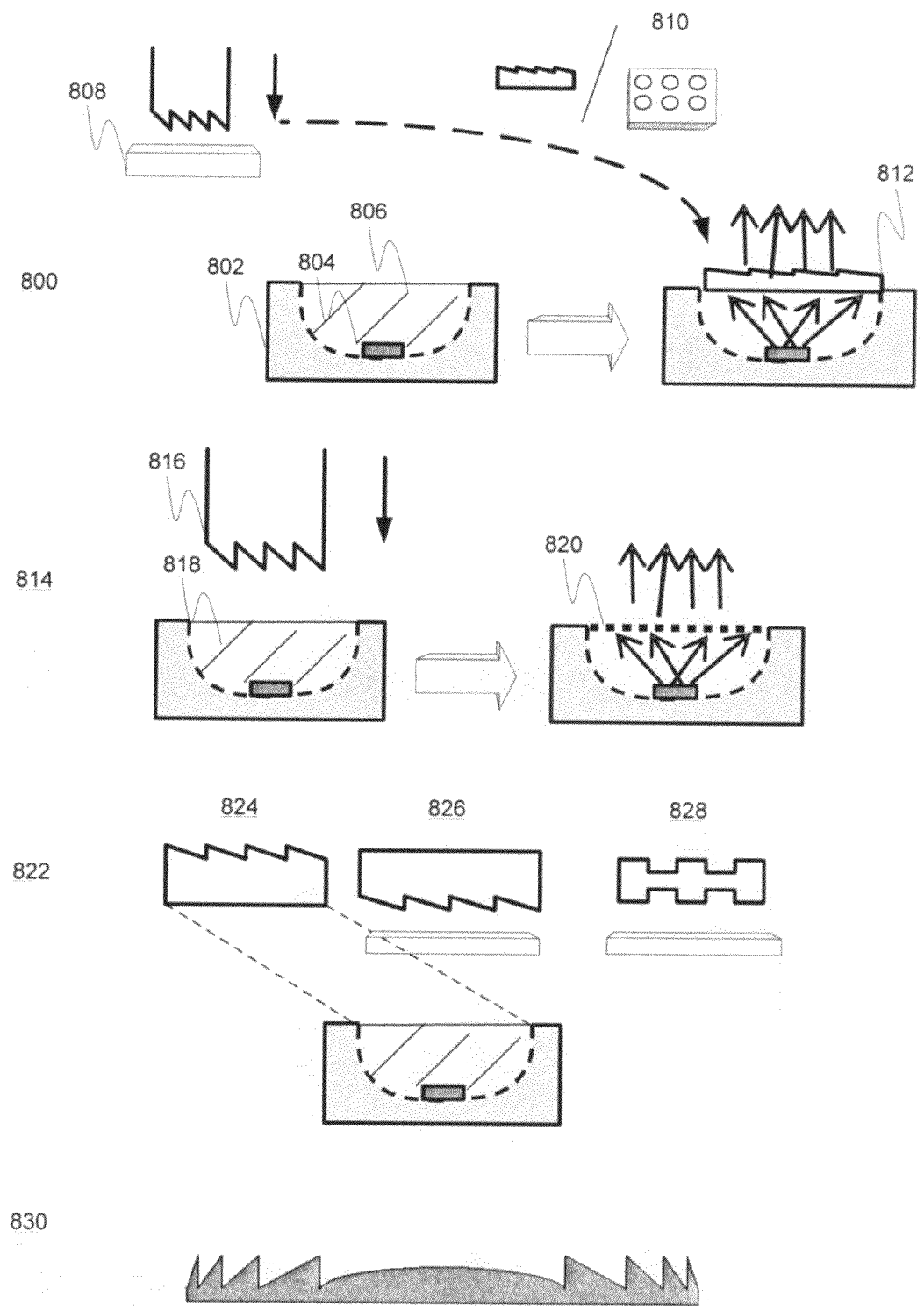
FIG. 8a visualizes replication of micro-optic lenses according to two embodiments of the invention.

Typically, an efficient micro-optic lens can be replicated to a LED in two ways. Either the lens may be discrete, or the lens may be replicated straight onto the encapsulation material of the LED. FIG. 8a depicts these replication approaches of micro-optic lenses for lighting elements such as the aforementioned LEDs.

In the first approach 800 shown in FIG. 8a, a discrete micro-lens element 810 is laminated on top of a LED chip 804 or package 802. Reference numeral 806 refers to optically transparent material that may already be present directly on top of the LED chip 804. The associated LED may also be a multi-chip LED to be covered by a micro-lens matrix (shown as a rectangle including a plurality of 'lens' circles in the figure). In one embodiment, the lens may be replicated, see reference numeral 808, on a polymer resin, which can be of either a UV or a thermally curable type, for example. The resin can be first thinly dispensed onto a polymer film, for example PMMA, and the lens master is placed in contact with the resin. The solution can exploit, e.g. PDMS stamping tools based on silicone. Next, the resin may be cured, optionally utilizing, e.g. UV lamp or oven, yielding one replicated lens. The substrate, such as the aforesaid polymer film carrying the micro-optic lens, can be then cut to size; the obtained lens 812 is finally attached to the target LED case.

In the second approach 814, the lens may be replicated directly onto the LED resin material above the chip: The approach may thus utilize the curable material 818 directly without any substrates, such as films, between. There are LEDs available, which can be bought without encapsulation. The LED chip or 'die' is in a small LED case, which can be filled with the desired resin, and when placing the master 816 on the resin and curing it, the lens 820 is integrally formed on the encapsulation.

Embodiment 822 illustrates a number of different options for providing a micro-optic lens for the LED. In one embodiment 824, the lens includes a surface relief structure on the surface facing away from the LED. In another embodiment, the surface relief structure of the lens is provided on the surface facing towards the LED instead. Also, an additional layer (thin rectangle in the figure) between the lens including the relief structure and the LED casing can be provided. In a further embodiment 828, includes surface relief forms on both sides of the lens, i.e. it is a question of a double-sided lens, and again, an additional layer is included. The surface relief forms may have different micro-optic forms and the blazed and binary gratings were shown for illustrative purposes, as being appreciated by those skilled in the art.

Embodiment 830 includes an, in many cases advantageous, lens form, a so-called Fresnel-lens, is shown to highlight the varying and rather complex nature of patterns (blazed forms, curved forms) that the useful lenses may have to define. It is clear that extraordinary precision is needed while manufacturing such forms, however enabled by the solutions of the present invention.

As described above, both UV and thermally curable materials exist, which are appropriate for micro-optic, especially diffractive optics lens, replication. There are a number of favorable properties regarding the materials though, which may be important when performing replication. In order to replicate microstructures efficiently, the material typically includes quite low surface tensions, low flow properties, and the mould shrinkage value typically is low. These properties can help to ensure that all small cavities etc. will be filled and that after curing, the formed structure will keep the same form, and remain unchanged. The cured material should tolerate high temperatures, because if lens replication is performed during the early process steps of LED manufacturing, it is at the reflow step at the latest, where this requirement shows its value. Other preferred favorable may include resistance to abrasion and hydrolysis. Chemical resistance to various solvents may also be desirable. In addition, adhesion to other materials may in practical circumstances be necessary. Most of the materials on the market fulfill these requirements. It is the optical properties that make the differences between them.

The materials typically must be optically transparent. This means that visible light transmission shall typically exceeds about 90%. Furthermore, they typically should not show yellowing during curing. Although a material might not absorb light, it can turn yellow, which is not desired in transmissive optics where white light, for example, is used. This is where the first distinguishing factors between materials become apparent. Typically, an important optical property in the context of LEDs is the refractive index (RI) of a material. LEDs are usually based on InGaAs or similar technologies, where the refractive indices are typically around about 2-3.5. When a LED produces light straight into air, for example, and where RI is about 1, a significant amount of total internal reflection of light will occur in the LED die, due to the high difference between the RI values. This will cause only a fraction of the light to be emitted out. If the die is encapsulated with an optical material, with an RI of about 1.5 or higher, further light will naturally be emitted out. Theoretically, all the light that is not recombined in the die would escape if an optical material had the same RI value as the LED die.

Optical UV materials are often one-component polymer resins that require ultraviolet light to start the cross-linking of the polymer chains, and they may be based on acrylic technology. The UV dose required is usually about 1 to about 5 $J/cm^2$, which is achieved for instance, with a lamp that produces over about 100 $mW/cm^2$ of UV light, which is easily obtained because a typical UV lamp normally produces over about 40 $W/cm^2$. The wavelength of the light should be in the range of about 250-400 nm. The time it takes to cure the material varies from few seconds to couple of minutes, depending on the thickness of the resin layer, the UV lamp used, and the distance of the light source. UV curable resins are popular, due to their ease of use and fast curing properties. Some UV materials on the market fulfil all the requirements for an optical adhesive.

Thermally curable materials are usually based on epoxies. Both one- and two-component epoxies are appropriate for replication. The temperature range typically required for curing is from about 80° C. to about 200° C. The advantages of epoxy-based resins over acrylic materials are higher RI values, which can be over about 1.7, better heat resistance and superior adhesion to materials. Typical disadvantages are longer curing times, varying from few minutes to hours, depending on the temperature, and the mixing of the two components to a specific ratio.

Both of the lens types can be fabricated with a suitable (flip-)chip bonding device, for example. In case of UV curing, using a thin optical fibre, like those used in surgical situations, and placing it into the chip vacuum channel provides one possible placement option. This allows the UV resin to be cured from above.

Integrated lenses may be fabricated by attaching first the silicone stamping tool, optionally manufactured as described in this text, onto the stamping head. The LED may then be attached to a plastic board and placed on the worktable. If the bonder has a dispenser unit, which produces small paste drops during the process of flip-chip bonding, it can be used in the lens replication process. The only changes that typically need to be made are for the paste syringe to be changed and replaced by a UV resin syringe and some adjustments made to the amount of dispensing. Thus, the resin can be injected into the LED case.

The alignment of the lens onto the LED may be one phase of the process and provided that the bonder is equipped with a camera, the camera may be used for positioning purposes in one embodiment of the invention. After alignment, the head may be lowered until the tool is in contact with the LED case. Finally, UV light may be used to cure the resin.

Considering next an embodiment for fabricating especially discrete lenses, e.g. an approximately 0.25 mm thick PMMA sheet may be placed on the worktable and a small drop of the resin be dispensed onto it. The stamping head may then be lowered until the resin is compressed between the tool and the sheet as desired. The formed lens may then be cut off and moved on top of the LED. Also the manufacturing of discrete lenses can be performed with a flip-chip bonder with few changes. Typically, an appropriate cutting tool needs to be added for extracting the lens from the substrate; otherwise as the bonder is designed for pick-and-place situations, the application is ready.

Figure 8B:
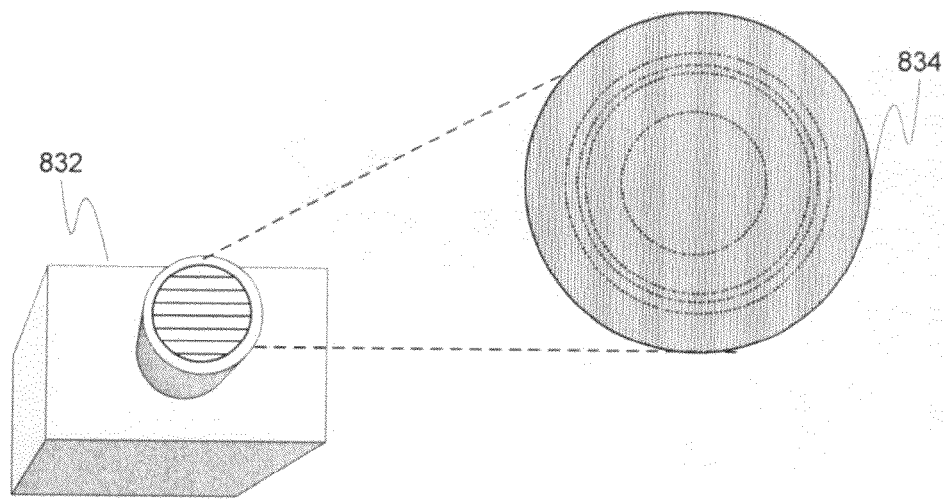
FIG. 8b illustrates a stamping tool for lens creation according to one embodiment of the present invention.

FIG. 8b illustrates an embodiment of a stamping tool for micro-optic lens creation, for example. The stamping tool 832 has a protrusion the surface pattern of which 834, i.e. the 'tip' of the tool, includes a mirror replica of micro-optic forms, such as variable grooves and recesses to be embossed on the target substrate.

Figure 9:
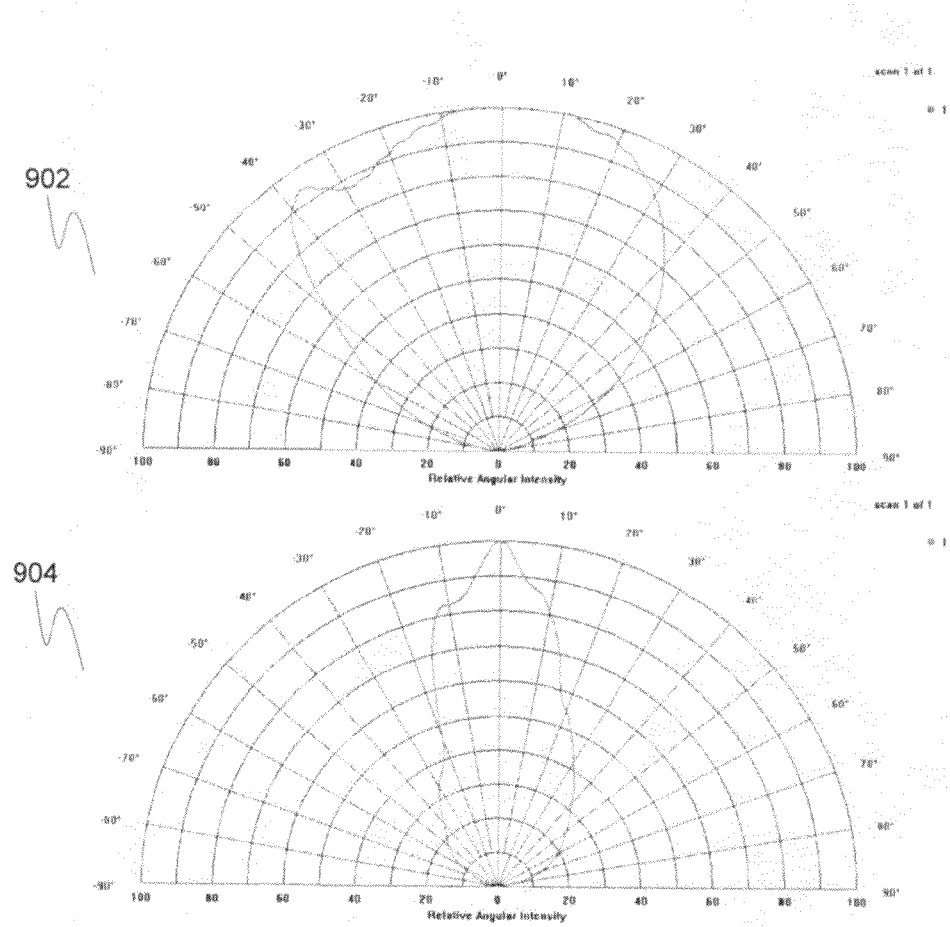
FIG. 9 visualizes differences between prior art lenses and lenses obtained via exploitation of embodiments of the present invention in relation to light collimation performance.

FIG. 9 illustrates exemplary radiation patterns 902, 904 of a prior art lens and a micro-optic DO lens fabricated in accordance with the present invention, respectively, which are used in collimating light output from a LED. As can been seen from the patterns, light that is outcoupled via the lens of the invention is collimating light, i.e. increasing directivity thereof, much more efficiently (note the narrower pattern) than the prior art lens. Generally, in the tested scenarios the intensity values increased and the collimation angles became narrower down to desirable values due to the use of lenses of the present invention. Tests performed with the Toray bonder showed that this kind of lens replication also works well in automated processes, hence enabling mass production of LEDs with micro-optics such as diffractive optics lenses.

To protect the obtained lenses from scratches, for example, one or more encapsulation layers can be added while keeping in mind that more material will often convert into additional losses in luminous flux, and possibly, a drop in intensity as well. When the lenses are placed upside down, i.e. the surface relief pattern faces towards the LED, according to one embodiment of the invention, a cover for the lens structure is simultaneously obtained.

Figure 10:
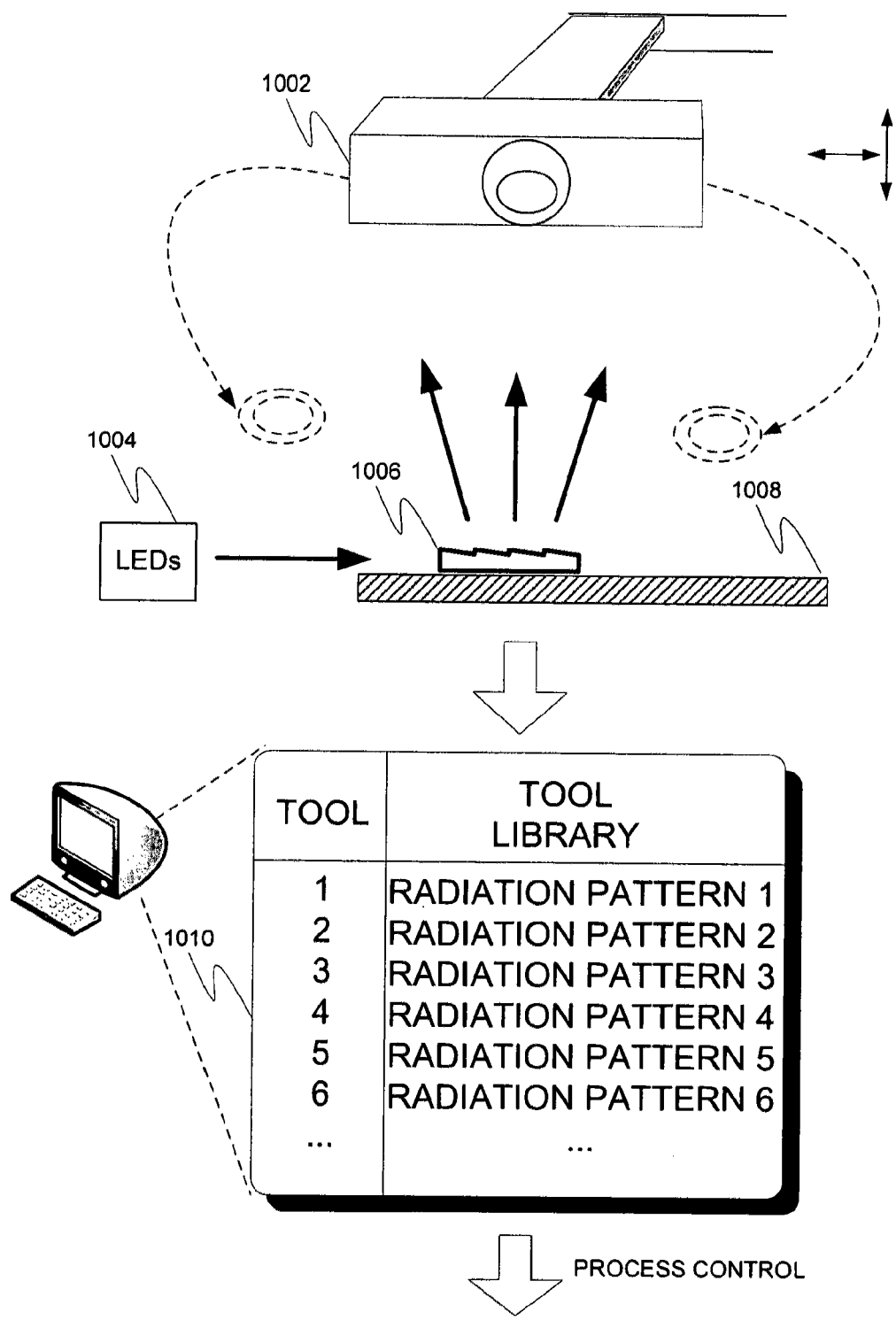
FIG. 10 discloses one embodiment of a step embossing system equipped with camera for stepwise real-input fabrication of optic structures on a substrate.

FIG. 10 illustrates an embodiment of the present invention wherein a camera 1002, either a conoscopic camera arrangement capable of three-dimensional, e.g. (hemi)spherical, imaging or a standard two-dimensional camera is utilized in the system of the invention. The camera, e.g. a CMOS or CCD camera, may be installed in connection with the utilized embossing machine so that the whole process to be described hereinafter can be automated. In case of conoscopy, a means for moving and rotating the camera in relation to the target element 1006 is provided.

In one embodiment each stamping tool or a some sort of replica element, see reference numeral 1006, including a respective surface relief structure or a mirror thereof, is positioned on a predetermined surface, e.g. the worktable 1008 of the embossing device, so that a light source, such as a desired number of LEDs 1004, can be arranged to properly incouple light into the element 1006 in order to enable the camera 1002 to capture either two- (e.g. taken directly from above the predetermined light output surface of the element 1006) or three-dimensional radiation pattern including e.g. illumination efficiency information in relation to angle distribution information. Also, other parameters can be measured and/or derived from the radiation pattern.

The captured radiation pattern and/or other measured or derived information may be used to form a tool library 1010, wherein information may be indexed or otherwise structured on element 1006 basis. The obtained information may be provided concerning each stamping tool, for example. The tool library may be implemented as a computer application running at the embossing device. The tool library 1010 may link a certain surface relief structure or design with a certain group of parameters values and/or a certain radiation pattern. In addition or alternatively, e.g. a neural network or some other intelligent mapping tool can be set up using a predetermined learning algorithm (e.g. back propagation) so as to output a certain stamping tool (e.g. id thereof) and/or other parameter values in relation to a certain type of radiation pattern provided as input. The library 1010 may also be hosted by a separate computer wherefrom the library or at least information therefrom may be provided forward or remotely accessed, e.g. via a communication connection, for process control purposes.

Figure 11:
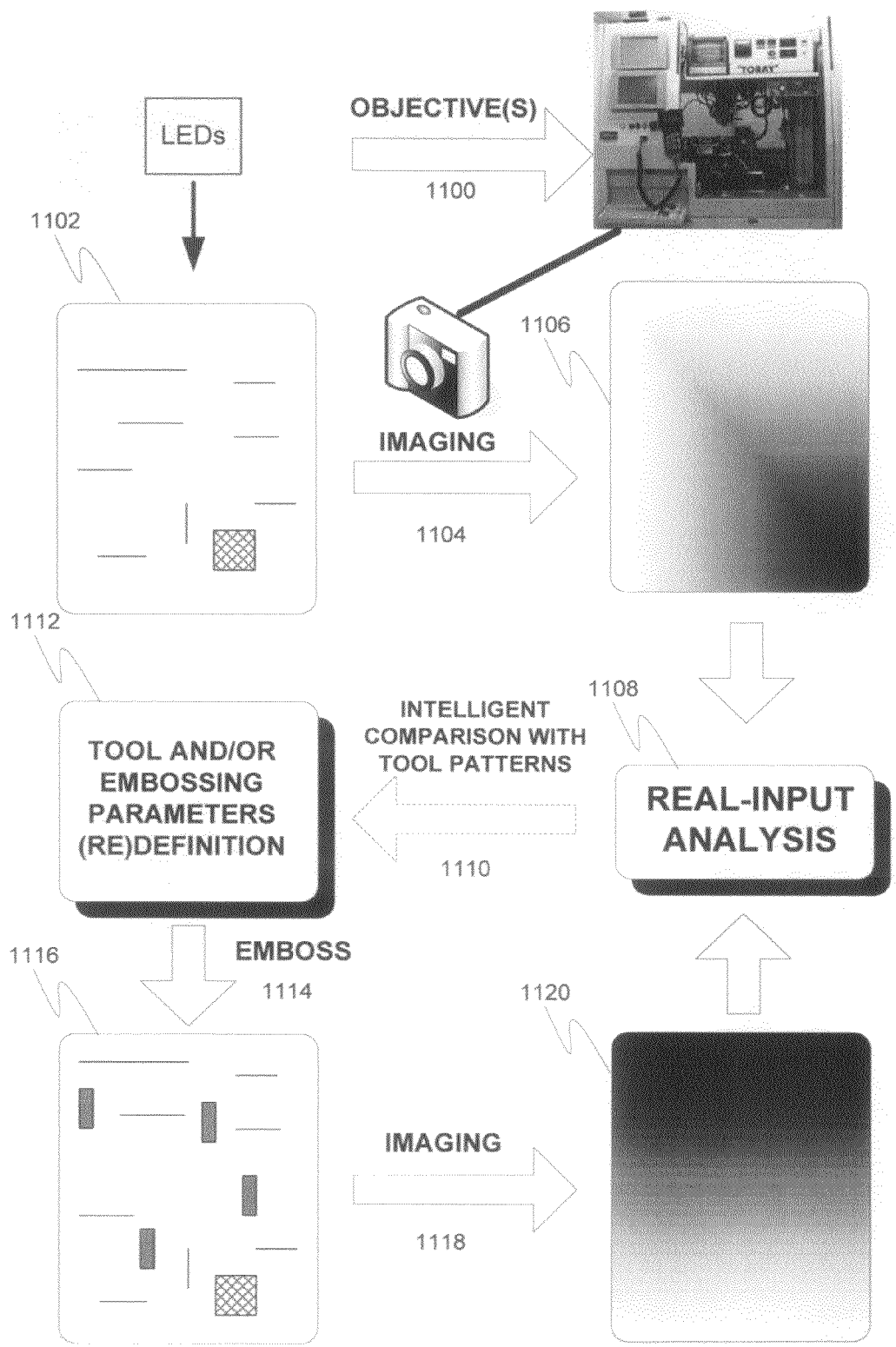
FIG. 11 visualizes optical design that is altered during the stepwise real-input arrangement of FIG. 10.

An embodiment of such process control is illustrated in FIG. 11. This time a non-completed, e.g. 0-80% ready, optical design 1102 is illuminated by a light source so that two- (typically faster and in many applications sufficient measurement) or three-dimensional radiation pattern is captured 1104. Objectives 1100 relating to the design, e.g. the desired predetermined radiation pattern and/or other illumination related parameters, may also be provided to the executing system, e.g. the embossing device may be further equipped with a camera apparatus. In real-input analysis 1108 the objectives may be compared with the radiation pattern 1106 captured via imaging 1104 (and/or with other parameters) to estimate whether the desired design objective has been reached or not, and if not, can the end result be still enhanced by further processing. At 1110 radiation patterns and/or parameters (values) stored in the tool library may be intelligently, e.g. via a neural network or some preferred pattern recognition technique, traversed to find one or more stamping structures and/or other process parameters 1112, e.g. related embossing coordinates, which provide a positive effect to the current radiation pattern of the current non-completed design so that the differences between it and the desired design objective are advantageously reduced. Such stamping tool may be selected and a new embossing round 1114 may be initiated during which predetermined portions of the optical design are embossed. The resulting design 116 may again be imaged 118 and the obtained radiation pattern 1120 may be compared with the design objective. Such procedure may be continued until a desired level of optic accuracy is achieved and the design is ready.

The scope of the invention is found in the following claims. It is self-evident to a skilled person that various modifications may be made to the explicitly disclosed solutions without diverging from the overall inventive concept as defined by the claims and related equivalents thereof.

The invention claimed is:

1. A method for manufacturing micro-optic surface design with complex, variable three-dimensional forms, the method comprising:

obtaining a step embossing, step imprinting, a chip bonding or a corresponding device capable of patterning the surface of a target substrate;

obtaining the target substrate whereto the micro-optic structures shall be patterned;

obtaining illumination performance of the target substrate when illuminated by a specified light source, the illumination performance including one or more of: luminance, transmitted light intensity, transmitted light uniformity, or transmitted light radiation pattern;

obtaining a plurality of different stamping tools operable with said device, each stamping tool comprising one or more surface relief forms defining one or more micro-optic structures;

obtaining an optical design objective based at least in part on current optical properties including the illumination performance of the target substrate and/or a refractive index of the target substrate;

selecting a stamping tool from said plurality of stamping tools by said device according to the optical design objective;

embossing the target substrate with said selected stamping tool as controlled by said device; and repeating said selecting and embossing steps until the micro-optic surface design has been completed on the substrate.

2. The method according to claim 1, wherein said obtaining comprises manufacturing at least one of stamping tools belonging to said plurality of stamping tools by at least one technique selected from a group including: micro-machining, lithography, and laser ablation.

3. The method according to claim 1, wherein said selecting comprises at least one action selected from a group including: picking up a stamping tool from a predetermined location by a stamping head and/or manipulator arm, and rotating an element comprising a plurality of stamping tools so that said the desired stamping tool is selected.

4. The method according to claim 1, further comprising: comparing the optical design objective to the current optical properties of the target substrate via utilization of at least one element selected from a group including: a conoscope, and a camera.

5. The method according to claim 4, further comprising obtaining an illumination performance indicator, including one or more of: luminance, intensity, uniformity, or radiation pattern for one or more stamping tools of said plurality of different stamping tools so as to enable stamping tool selection by comparative measures concerning said illumination performance of the target substrate and illumination performance indicators of said one or more stamping tools.

6. The method according to claim 1, further comprising: performing a comparison of the optical design objective to the current optical properties of the target substrate; and selecting, based at least on the comparison of the optical design objective to the current optical properties of the target substrate, one or more embossing locations on the target substrate whereto embossing shall take place in order to bring the optical properties of the target substrate closer to the optical design objective.

7. The method according to claim 1, wherein said target substrate includes predetermined micro-optic surface relief forms and said embossing comprises embossing new micro-optic surface relief forms adjacent to or on top of at least some of said predetermined micro-optic surface relief forms.

8. The method according to claim 1, further comprising: stopping, by a member located on the substrate or in connection with the stamping tool or with another element of said device, said one or more micro-optic structures of the selected stamping tool from penetrating into the substrate over a predetermined depth.

9. The method according to claim 1, further comprising: reducing, by a member located on the substrate or in connection with the stamping tool or with another element of said device, heat conduction from the device onto the substrate areas adjacent to the current embossing area.

10. The method according to claim 1, wherein embossing depth is controlled by at least one element selected from a group consisting of: pressure, heat, and embossing time.

11. The method according to claim 1, wherein the target substrate is used to form at least a part of one or more micro-optic lenses for optical devices including light-emitting diodes.

12. An arrangement for manufacturing micro-optic surface design with complex, variable three-dimensional forms, said arrangement comprising:

a processor and a memory for processing and storing information defining an optical design objective, respectively;

a movable member for receiving a stamping tool; and a number of stamping tools operable with said movable member and capable of embossing a target substrate with associated micro-optic surface relief forms, wherein said arrangement is configured to:

obtain the information defining the optical design objective, the information being based at least in part on illumination performance of the target substrate when illuminated by a specified light source, the illumination performance including one or more of: luminance, transmitted light intensity, transmitted light uniformity, or transmitted light radiation pattern, select a stamping tool from said number of stamping tools according to the information, move said selected stamping tool in relation to said substrate so as to emboss a plurality of predetermined areas of the target substrate with said selected stamping tool, and repeat a procedure of selecting a further stamping tool from said number of stamping tools and moving said selected further stamping tool according to the information so as to emboss one or more predetermined areas of the target substrate with said selected further stamping tool, until the optical design objective has been completed.

13. The arrangement according to claim 12, further comprising:

a heater for heating a stamping tool to a predetermined temperature for heat embossing.

14. The arrangement according to claim 12, further comprising:

a source of ultraviolet light for curing an ultraviolet light-curable target substrate.

15. The arrangement according to claim 12, further comprising:

a conoscope or a camera that can capture the illumination performance of the target substrate, wherein said arrangement is configured to compare the optical design objective to current optical properties of the target substrate.

16. The arrangement according to claim 15, wherein the conoscope or the camera can obtain illumination performance indicators of one or more stamping tools of the number of stamping tools, wherein said arrangement is configured to perform analysis of the optical design objective against current optical properties of the target substrate and the illumination performance indicators of the one or more stamping tools to determine, on the basis of the analysis, the stamping tool to be selected that will bring the optical properties of the target substrate closer to the optical design objective.

17. The arrangement according to claim 12, wherein the arrangement is configured to emboss one or more new micro-optic surface relief forms adjacent to or on top of one or more micro-optic surface relief forms already residing on the substrate.

18. The arrangement according to claim 12, further comprising:

a contact member for preventing the micro-optic surface relief forms of the selected stamping tool from penetrating into the substrate over a predetermined depth.

19. The arrangement according to claim 12, further comprising:

a heat insulator for reducing heat conduction from the arrangement to a substrate area adjacent to the current embossing area.

20. The arrangement according to claim 12, wherein the arrangement is configured to control embossing depth by at least one control element selected from a group consisting of: pressure, heat, and embossing time.

21. The arrangement according to claim 12, wherein the associated micro-optic surface relief forms include a blazed profile.

22. The arrangement according to claim 12, wherein the associated micro-optic surface relief forms include a curved profile.

23. The arrangement according to claim 12, wherein the associated micro-optic surface relief forms include a hybrid profile.

* * * * *